(12) United States Patent
Iida et al.

(10) Patent No.: US 7,889,623 B2
(45) Date of Patent: Feb. 15, 2011

(54) REFLECTING MIRROR AND OPTICAL PICKUP

(75) Inventors: Takeshi Iida, Tochigi (JP); Ryuichi Okazki, Tochigi (JP)

(73) Assignee: Fujinon Corporation, Saitama (JP)

( * ) Notice: Subject to any disclaimer, the term of this patent is extended or adjusted under 35 U.S.C. 154(b) by 965 days.

(21) Appl. No.: 11/556,824

(22) Filed: Nov. 6, 2006

(65) Prior Publication Data

US 2007/0109676 A1 May 17, 2007

(30) Foreign Application Priority Data

Nov. 14, 2005 (JP) ............................... 2005-328985

(51) Int. Cl.
*G11B 7/135* (2006.01)
(52) U.S. Cl. ................................. 369/112.29
(58) Field of Classification Search ........................ None
See application file for complete search history.

(56) References Cited

U.S. PATENT DOCUMENTS

| 6,525,296 B2* | 2/2003 | Matsushima et al. ... 219/121.69 |
| 2003/0058529 A1* | 3/2003 | Goldstein ................... 359/361 |
| 2003/0228530 A1* | 12/2003 | Yan et al. ....................... 430/5 |
| 2004/0061937 A1* | 4/2004 | Masubuchi et al. ......... 359/487 |
| 2005/0157384 A1* | 7/2005 | Shiraishi et al. ............. 359/359 |
| 2005/0157627 A1* | 7/2005 | Kanazawa et al. .......... 369/125 |
| 2006/0291238 A1* | 12/2006 | Epstein et al. .............. 362/600 |

FOREIGN PATENT DOCUMENTS

JP          03-012605          1/1991

* cited by examiner

*Primary Examiner*—Peter Vincent Agustin
*Assistant Examiner*—Emily Frank
(74) *Attorney, Agent, or Firm*—Birch, Stewart, Kolasch & Birch, LLP

(57) ABSTRACT

A reflecting mirror with a reflective multi-layer coating capable reflecting light beams of discrete wavelengths, e.g., laser beams in the wave ranges of CD, DVD and mass storage optical discs, free of the problem of light absorption.

4 Claims, 7 Drawing Sheets

REFLECTING MIRROR AND OPTICAL PICKUP

BACKGROUND OF THE INVENTION

1. Field of the Art

This invention relates to a reflecting mirror capable of reflecting light beams of discrete wavelengths, and an optical pickup incorporating the reflecting mirror.

2. Prior Art

Generally, an optical pickup is constituted by a light source, polarized beam splitter, λ/4 wave plate, objective lens, APC (Auto Power Control and a photodetector. A light beam from a light source is fed to a polarized beam splitter to separate p-polarized light and s-polarized light. One of separated p- and s-polarized light beams is shed on an optical disc while the other one is shed on an APC for detection of signals. The light beam to be shed on an optical disc is converted from linearly polarized light to circularly polarized light by a λ/4 wave plate and reflected off the optical disc, and further converted from circularly polarized light to linearly polarized light by the λ/4 wave plate before entering the polarized beam splitter again. Since the direction of polarization is shifted 90 degrees at the time of re-entering the polarized beam splitter, the incident light beam is either transmitted through or reflected off and shed on a signal detector. Generally, in an optical pickup of this sort, a light beam is projected from a light source along a light path parallel with the surface of an optical disc, and the parallel light path is turned toward the optical disc by the use of a reflecting mirror (turning mirror).

Optical pickups employs a laser beam and thus a light source which outputs a laser beam. On the other hand, as the reflecting mirror mentioned above, there may be employed a reflecting mirror having a metal film deposited on a surface of a substrate or a reflecting mirror having a dielectric multi-layer film coating formed by alternately laminating a high refractivity layer and a low refractivity layer one after another. Because a metal film is susceptible to corrosion, oxidation and bruises or other damages, and because of the ability of efficiently reflecting off a specific wavelength, it has been the general practice for an optical pickup to employ a reflecting mirror with a dielectric multi-layer coating.

In the case of a reflecting mirror with a dielectric coating, generally $TiO_2$ and $SiO_2$ are used for the high and low refractivity layers, respectively. Namely, among various materials which are useful for depositing the high refractivity layers, $TiO_2$ is used in most cases for its high refractivity. The large difference in refractivity between the high refractivity material $TiO_2$ and the low refractivity material $SiO_2$ makes it possible to reduce the number of layers in producing a dielectric coating which is capable of reflecting a laser beam of a specific wavelength.

In this connection, recently optical pickups are required to cope with not only CDs (Compact Discs) using a laser beam of 780 nm in wavelength and DVDs (Digital Versatile Discs) using a laser beam of 650 nm but also to mass storage optical discs (using the so-called blue laser of 405 nm in writing and reading data). In a case where high and low refractivity layers are formed of $TiO_2$ and $SiO_2$, with a large difference in refractivity as mentioned above, a dielectric multi-layer coating with optical characteristics of reflecting three discrete wavelengths can be formed by depositing a reduced number of high and low refractivity layers. However, $TiO_2$ which absorbs light of short wavelength has a problem that it invites degradations in efficiency of luminous energy. That is, when a light beam of 405 nm is cast on a dielectric multi-layer coating consisting of alternately laminated layers of $TiO_2$ and $SiO_2$, part of energy of incident light is absorbed by the action $TiO_2$ layers. Therefore, part of incident light is not reflected by the dielectric multi-layer coating, resulting in a drop in efficiency of luminous energy.

In this regard, Japanese Laid-Open Patent Application H3-12605 discloses a reflecting mirror with a dielectric multi-layer coating which is arranged to avoid the above-mentioned problem of light absorption.

In the case of Japanese Laid-Open Patent Application H3-12605, thin layers of a first group are formed on a substrate, and then thin layers of a second group are formed on the first group. The thin layers of the first group are formed by the use of a material which is absorptive of light in an ultraviolet wavelength range, while the thin layers of the second group are formed by the use of a material which is not absorptive of light in the ultraviolet wavelength range. Ultraviolet light rays incident on the reflecting mirror are reflected off by the thin layers of the second group, that is to say, incident ultraviolet light rays are reflected off without being absorbed by the mirror. On the other hand, as described in Japanese Laid-Open Patent Application H3-12605, the thin layers of the first group are formed of a material which is absorptive of light in an ultraviolet wavelength range. This is because the use of a material which is absorptive of light in an ultraviolet wavelength range is effective for broadening a reflecting band width which appears in an ultraviolet wavelength range.

In the case of a reflecting mirror with a dielectric multi-layer coating which is formed by alternately laminating a high refractivity layer and a low refractivity layer one after another, lamination of a great number of layers is necessary in order to impart optical characteristics for reflection of a plural number of discrete wavelengths. In Japanese Laid-Open Patent Application H3-12605 mentioned above, the layers are divided into a first group and a second group but as a whole the number of the layers is not reduced.

SUMMARY OF THE INVENTION

In view of the foregoing situations, it is an object of the present invention to provide a reflecting mirror with a dielectric multi-layer coating which is free from the problem of light absorption and which is constructed of a reduced number of layers.

According to the present invention, in order to achieve the above-state objective, there is provided a reflecting mirror virtually capable of totally reflecting light beams of two or more discrete wavelengths, characterized in that the reflecting mirror comprises: a first reflective multi-layer coating formed on a substrate plate by alternately depositing a first high refractivity layer absorptive of light of short wave and a low refractivity layer;

a second reflective multi-layer coating formed over an incident side of the first reflective multi-layer coating, by alternately depositing a barely light absorptive second high refractivity layer having a lower refractivity than the first high refractivity layer and a low refractivity layer;

an incident light beam of short wave being reflected off by the second reflective multi-layer coating while incident light beams of wave ranges other than short wave are reflected off by cooperative actions of the first and second reflective multi-layer coatings.

In an optical pickup according to the present invention, the above reflecting mirror is incorporated in a light path to or from a light source, polarized beam splitter, λ/4 wave plate and photodetector.

The above and other objects, features and advantages of the present invention will become apparent from the following particular description, taken in conjunction with the accompanying drawings which show by way of example preferred embodiments of the invention. Needless to say, the present invention should not be construed as being limited to particular forms shown in the drawings.

DESCRIPTION OF PREFERRED EMBODIMENTS

Figure 1:
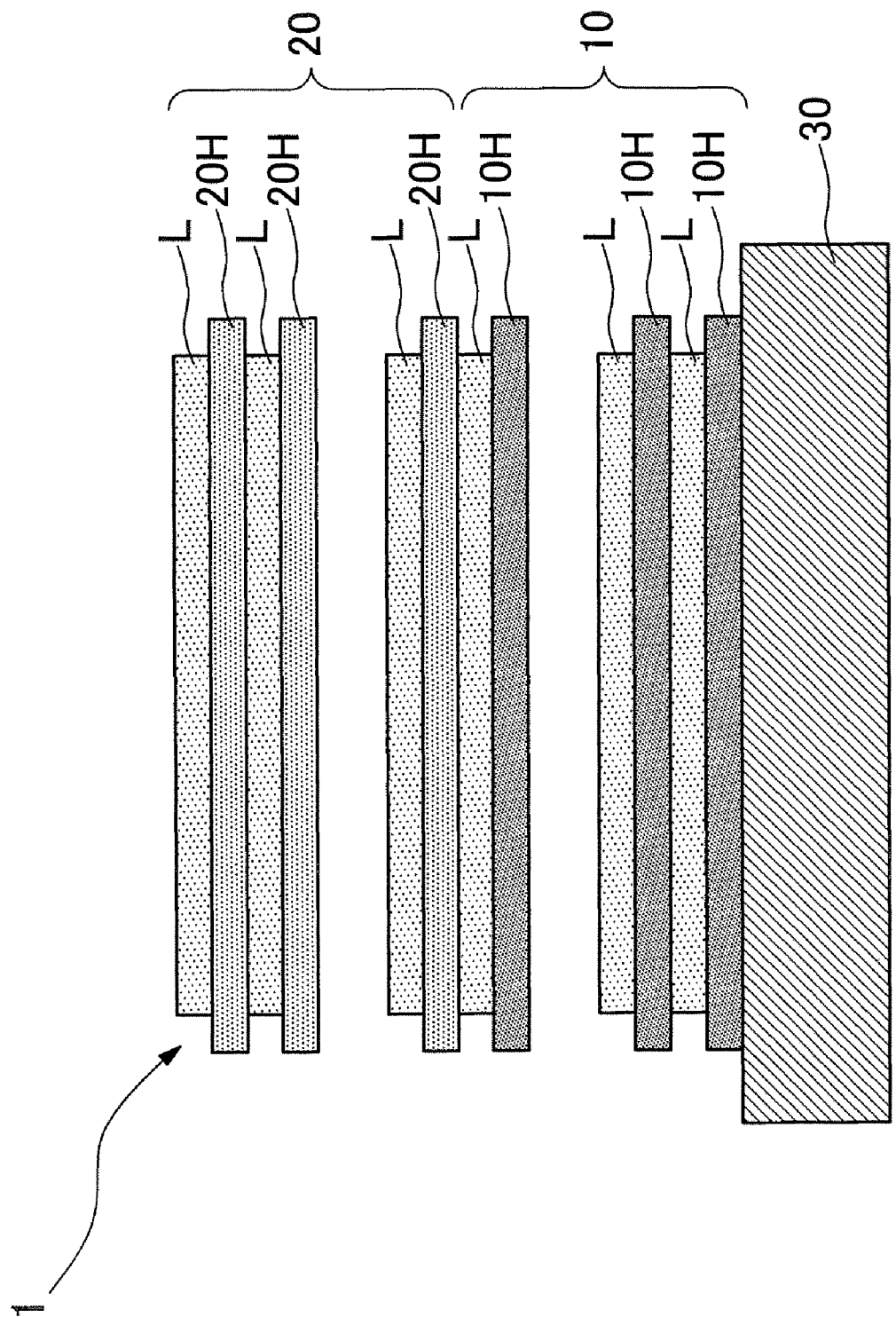
FIG. 1 is a schematic illustration of construction of a reflective multi-layer coating of a reflecting mirror.

Now, the present invention is described more particularly by way of its preferred embodiments with reference to the accompanying drawings. Referring to FIG. 1, there is shown a reflecting mirror 1 with a first reflective multi-layer coating 10 which is deposited on a substrate plate 30 like a glass substrate plate and a second reflective multi-layer coating 20 which is deposited on the first reflective multi-layer coating. Light incident on the reflecting mirror 1 is firstly shed on the second reflective multi-layer coating 20. That is, the second reflective multi-layer coating 20 is formed on the side of incident light, while the first reflective multi-layer coating 10 is formed on the side of the substrate plate 30. Both of the first and second reflective multi-layer coatings 20 and 30 are a dielectric multi-layer coating formed by alternately depositing a high reflectivity layer and a low reflectivity layer. At the same time, the first and second reflective multi-layer coatings 10 and 20 are reflective of light of different wavelengths. Therefore, the first and second reflective multi-layer coatings 10 and 20 are each in the form of a dielectric multi-layer coating which is formed by alternately depositing a high refractivity layer and a low refractivity layer, but totally or partly differ from each other in constituent material and thickness of the alternately laminated layers. In this instance, the same material is used for low refractivity layers of the first and second reflective multi-layer coatings 10 and 20. On the other hand, high refractivity layers of the first and second reflective multi-layer coatings 10 and 20 are formed of different materials. Of course, different materials can be used in depositing low refractivity layers of the first and second multi-layer coatings 10 and 20.

As shown in FIG. 1, in the first place the first reflective multi-layer coating 10 deposited on top of the substrate plate 30, and then the second reflective multi-layer coating 20 is deposited on top of the first reflective multi-layer coating 10. As mentioned hereinbefore, first high refractivity layers 10H in the first reflective multi-layer coating 10 are formed of a different material from second high refractivity layers 20H in the second reflective multi-layer coating 20. However, low refractivity layers L in the first and second reflective multi-layer coatings 10 and 20 are formed of the same or common material. In this instance, the first reflective multi-layer coating 10 is imparted with optical characteristics of reflecting light in the vicinity of a DVD wave range (650 nm) as well as light in the vicinity of a CD wave range (780 nm) almost 100%. On the other hand, the second reflective multi-layer coating 20 is imparted with optical characteristics of reflecting light in the vicinity of a wave range of mass storage optical discs (using blue laser light of 405 nm) almost 100%.

The second reflective multi-layer coating 20 which is adapted to reflect light of mass storage optical discs also has optical characteristics of reflecting light in CD and DVD wave ranges to some extent. As seen in FIG. 1, the second reflective multi-layer coating 20 is formed on the light incident side anterior to the first reflective multi-layer coating 10. Therefore, light in CD and DVD wave ranges is shed firstly on the second reflective multi-layer coating 20 and thereby reflected off to some extent. That is to say, light in CD and DVD wave ranges is reflected by cooperative actions of the first and second multi-layer coatings 10 and 20, and 100% reflection by the first reflective multi-layer coating 10 alone is not necessary.

High refractivity layers (second high refractivity layers 20H) and low refractivity layers (low refractivity layers L) of the second reflective multi-layer coating 20, which reflects off short waves in the vicinity of 405 nm, are formed of materials which are barely absorptive of incident short wave light. It is known that light absorption takes place when short wave light is shed on a highly refractive dielectric coating. Shorter the wavelength, higher becomes the light energy. Therefore, short wave light with strong energy is shed on a high refractivity layer, part of the energy is absorbed by the high refractivity layer, a phenomenon of "light absorption." In order to suppress this phenomenon, the second high refractivity layers 20H in the second reflective multi-layer coating 20 are formed of a material which is barely absorptive of short waves.

Thus, light in a wave range of mass storage optical discs is reflected off by the second reflective multi-layer coating 20 without being absorbed by the coating, and light in CD and DVD wave ranges is reflected off by the first and second reflective multi-layer coatings 10 and 20. In this regard, it is conceivable to apply the high refractivity layers of the second reflective multi-layer coating 20 to the entire reflective multi-layer coating. However, the high refractivity layers 20H of the second reflective multi-layer coating 20, which are barely absorptive of light, is lower in refractivity than the first high refractivity layers 10H which are light-absorptive. Therefore, in case the entire reflective multi-layer is constructed in the fashion of the second reflective multi-layer coating 20, a greater number of layers are required to realize a reflective multi-layer coating utilizing a difference in refractivity. The number of layers as a whole can be reduced in case the first and second reflective multi-layer coatings 10 and 20 are deposited cooperatively as described above.

Light in a wave range of mass storage optical discs may not be completely reflected by the second reflective multi-layer coating 20. Namely, it becomes necessary to deposit a greater number of layers in order to get strictly 100% reflection of light in a wave range of mass storage optical discs by the second reflective multi-layer coating. Therefore, the second reflective multi-layer coating 20 may be tailored to have a reflectivity akin to 100%, if not 100%. In this case, light in a wave range of mass storage optical discs is transmitted through the second reflective multi-layer coating 20, and shed on the first reflective multi-layer coating 10 which is absorptive of light. However, the rate of light absorption by the first reflective multi-layer coating 10 is not extremely high, so that a transmitted fraction (several percent) of light in the wave range of mass storage optical discs is absorbed not entirely but partially in an extremely small amount. Thus, absorption of light in the wave range of mass storage optical discs takes place only at an ignorable rate, so that the second reflective multi-layer coating 20 is not necessarily required to have perfect 100% reflectivity with respect to light in the wave range of mass storage optical discs. In the foregoing description, the reflecting mirror 1 has been described in connection with light of three different wavelengths or in the wave ranges of CD, DVD and mass storage optical discs. However, it is to be understood that application of the reflecting mirror 1 is not limited to wavelengths of these optical discs, and similarly applicable to reflection of two or more wavelengths involving a wavelength which is susceptible to light absorption.

Thus, the reflecting mirror 1 according to the present invention employs a dielectric multi-layer coating which is constructed of a reduced number of layers and which is so arranged as to eliminate the problem of light absorption. Given below are Examples applying the above-described embodiment of the invention.

Example 1

In the above-described embodiment, a barely light absorptive material is selected for the low refractivity layers L which are commonly used in the first and second reflective multi-layer coatings 10 and 20. In this case, a material of $SiO_2$ (with a refractivity of approximately 1.47) base is used. In this regard, the low refractivity layers L may be formed of $SiO_2$ alone or an $SiO_2$-base material which contains, for example, a small amount (e.g., 5%) of $Al_2O_3$ or the like in addition to the major component $SiO_2$, provided that an additional substance is barely light absorptive. The first high refractivity layers 10H are formed by the use of $TiO_2$ which is light absorptive but has a high refractivity (with a refractivity of approximately 2.45). The second high refractivity layers 20H are formed by the use of $Nb_2O_5$ (with a refractivity of approximately 2.30) which is barely light absorptive. Although $Nb_2O_5$ is used for the second high refractivity layers 20H in this Example, there may be employed other barely light absorptive materials, for example, such as $Ta_2O_3$ (with a refractivity of approximately 2.1), $ZrO_2$ (with a refractivity of approximately 2.05), $CeO_2$ (with a refractivity of approximately 2.3), a lanthanum-titanium mixture oxide (Substance H4, a product of Merck), a zirconium-titanium mixture oxide (OH-5, a product of Optron), and the like. Considering high refractivity, low light absorption and high weatherability, $Nb_2O_5$ is preferred to be applied to the second high refractivity layers 20H. However, since the second reflective multi-layer coating 20 is imparted with reflection characteristics through utilization of a difference in refractivity between high and low refractivity layers, a material for the second high refractivity layers 20H should be higher in refractivity than $SiO_2$, a material of the low refractivity layers L.

Figure 2:
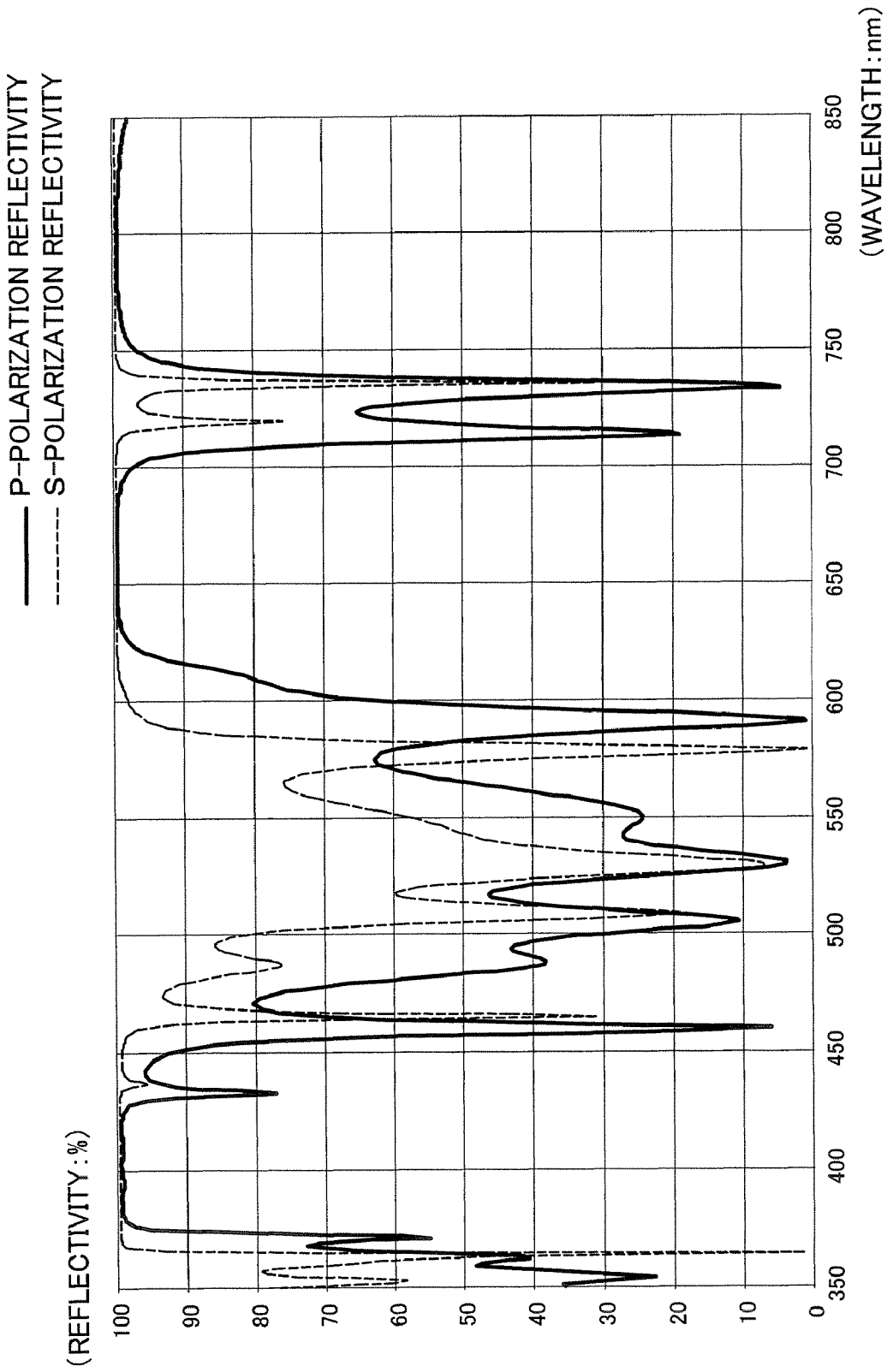
FIG. 2 is a graph showing reflectivity characteristics of an example in which ion plating is applied in forming a reflective multi-layer coating composed of a first reflective multi-layer coating consisting of alternately laminated $TiO_2$ and $SiO_2$ layers and a second reflective multi-layer coating consisting of alternately laminated $Nb_2O_5$ and $SiO_2$ layers.

Plotted in the graph of FIG. 2 are p- and s-polarized light reflection characteristics of a reflecting mirror having a first reflective multi-layer coating consisting of 24 alternately deposited $TiO_2$ and $SiO_2$ layers and a second reflective multi-layer coating consisting of 8 alternately deposited $Nb_2O_5$ and $SiO_2$ layers. In this instance, the angle of incidence of input light is 45 degrees, and above-mentioned substances are deposited by ion plating. As seen in FIG. 2, almost 100% p- and s-polarization reflectivity is attained in each one of the three wave ranges for CD, DVD and mass storage optical discs (i.e., in the wave ranges of 405 nm, 650 nm and 780 nm).

In this instance, since $Nb_2O_5$ is used for the second high refractivity layers 20H of the second reflective multi-layer coating 20, the reflecting mirror is free from the problem of degradations in efficiency of luminous energy as caused by light absorption. Besides, light beams in the CD and DVD wave ranges are reflected not solely by the first reflective multi-layer coating 10 but by cooperative actions of the first and second reflective multi-layer coatings 10 and 20, which can be reduced in number of layers.

Figure 3:
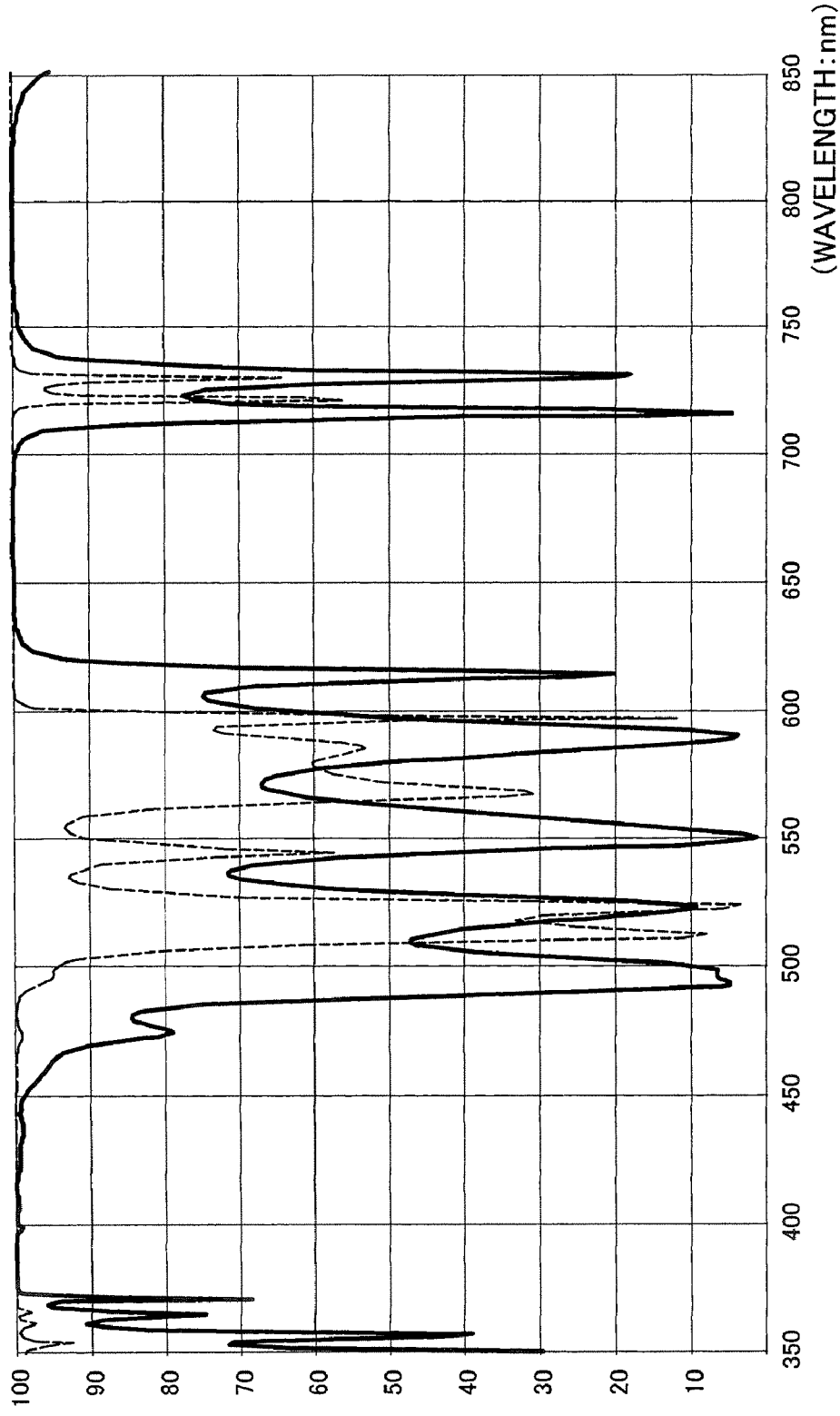
FIG. 3 is a graph showing reflectivity characteristics of an example in which ion plating is applied in forming a reflective multi-layer coating composed of alternately laminated $Nb_2O_5$ and $SiO_2$ layers.

Next, in a comparative example, solely $Nb_2O_5$ is used for the high refractivity layers while solely $SiO_2$ is used for the low refractivity layers. Namely, in this comparative example, a reflective multi-layer coating is formed by alternately depositing $Nb_2O_5$ and $SiO_2$, without using $TiO_2$. The $Nb_2O_5$ and $SiO_2$ layers were deposited on a substrate plate by ion plating, and the angle of incidence of input light is 45 degrees. Plotted in the graph of FIG. 3 are p- and s-polarization reflection characteristics of a dielectric multi-layer coating consisting of 46 alternately laminated $Nb_2O_5$ and $SiO_2$ layers. Similarly to the case of FIG. 2, almost 100% reflectivity is attained in the three wave ranges.

As mentioned hereinbefore, $Nb_2O_5$ (with a refractivity of approximately 2.3) is lower in refractivity as compared with $TiO_2$ (with a refractivity of approximately 2.45). Therefore, in case solely $Nb_2O_5$ is used for the high refractivity layers, the reflecting mirror is free from the problem of light absorption but needs a greater number of layers since the reflection characteristics are imparted through utilization of a difference in reflectivity between high and low refractivity layers. Therefore, in total 46 alternately laminated layers of $Nb_2O_5$ and $SiO_2$ are required to impart the reflection characteristics shown in FIG. 3. In other words, although almost the same reflection characteristics are obtained in FIGS. 2 and 3, it suffices to deposit in total 32 layers on the reflecting mirror 1 in case the dielectric coating is constructed of the first and second reflective multi-layer coatings but it becomes necessary to deposit 46 layers in total in case the dielectric coating is constructed of alternately deposited $Nb_2O_5$ and $SiO_2$ layers. Thus, as compared with the comparative example, the combination of the first and second multi-layer coatings 10 and 20 can produce higher reflection characteristics by deposition of a reduced number of high and low refractivity layers.

Example 2

Figure 4:
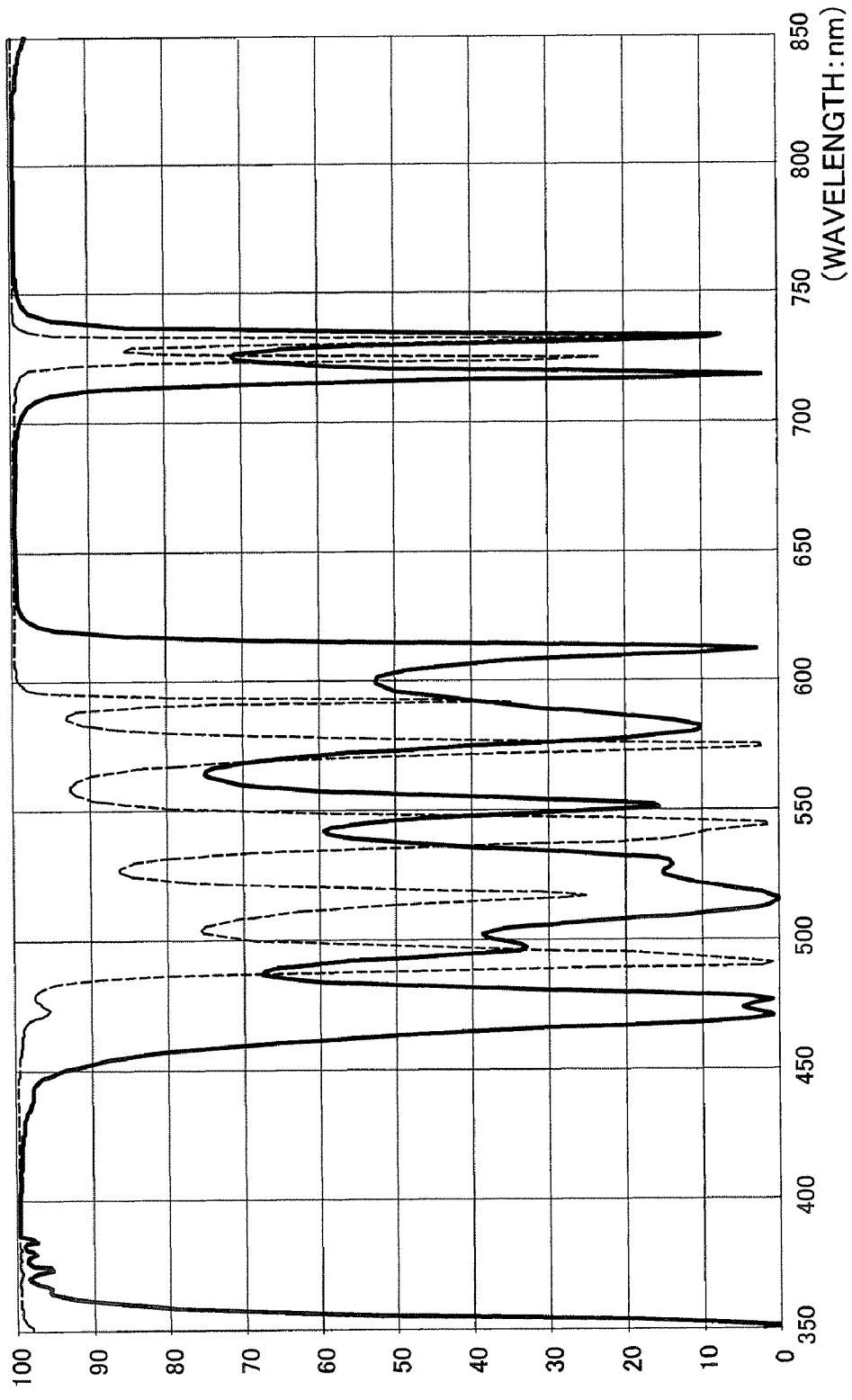
FIG. 4 is a graph showing reflectivity characteristics of an example in which vacuum deposition is applied in forming a reflective multi-layer coating composed of a first reflective multi-layer coating consisting of alternately laminated $TiO_2$ and $SiO_2$ layers and a second reflective multi-layer coating consisting of alternately laminated $Nb_2O_5$ and $SiO_2$ layers.

Instead of ion plating in Example 1, $TiO_2$, $Nb_2O_5$ and $SiO_2$ are deposited by vacuum deposition in this Example 2. As shown in FIG. 4 are p- and s-polarization reflection characteristics in a case where the first reflective multi-layer coating 10 is formed by alternately depositing $TiO_2$ and $SiO_2$ in 24 layers in total and the second reflective multi-layer coating 20 is formed by alternately depositing $Nb_2O_5$ and $SiO_2$ in 10 layers in total. The angle of incidence of input light is 45 degree, and all of above-mentioned substances are deposited by vacuum deposition. As seen in FIG. 4, almost 100% reflection is attained in each of the three wave ranges, i.e., in the wave ranges of CD, DVD and mass storage optical discs.

Figure 5:
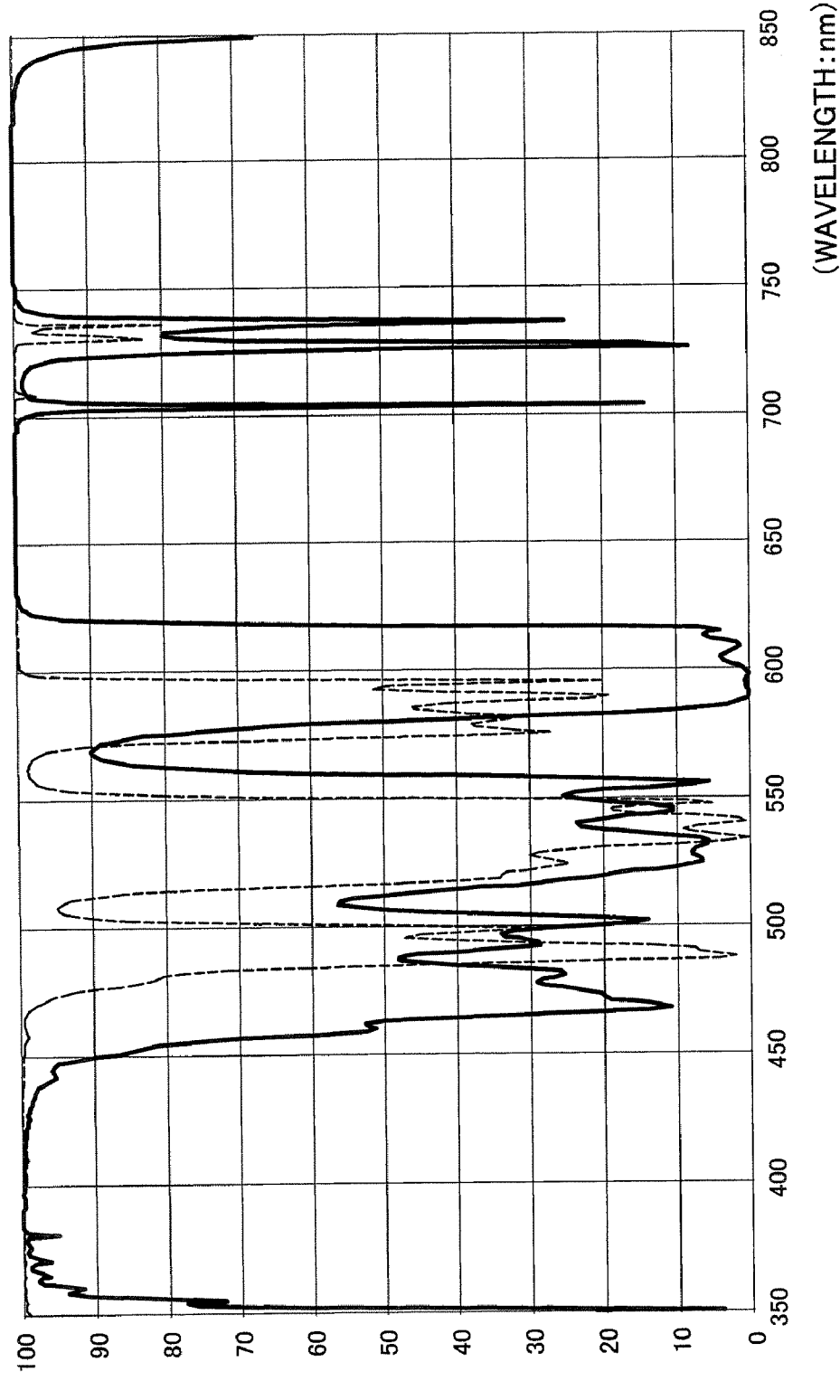
FIG. 5 is a graph showing reflectivity characteristics of an example in which vacuum deposition is applied in forming a reflective multi-layer coating composed of alternately laminated $Nb_2O_5$ and $SiO_2$ layers.

Shown in FIG. 5 are p- and s-polarization reflection characteristics in a case where vacuum deposition is applied in forming a reflective multi-layer coating by alternately depositing $Nb_2O_5$ and $SiO_2$ in 62 layers in total. It is necessary to deposit 62 layers in total in order to attain approximately 100% reflection of p- and s-polarizations in each one of the three wave ranges as shown in FIG. 5. The reflective multi-layer coating which is constructed of alternately deposited $Nb_2O_5$ and $SiO_2$ layers is free from the problem of light absorption, but requires a greater number of layers due to a smaller difference in refractivity as mentioned hereinbefore. A coating deposited by vacuum deposition is lower in density as compared with a coating by ion plating, and therefore lower in refractivity. This is the reason why deposition of 62 layers is required to obtain the reflection characteristics as shown in FIG. 5.

On the other hand, in case the first and second reflective multi-layer coatings 10 and 20 are deposited to reflect light in a co-operative way, it is possible to eliminate the problem of light absorption and to attain the reflection characteristics as shown in FIG. 4 by deposition of a reduced number of layers (34 layers in total) even if vacuum deposition is applied.

A minimal layer construction for the first and second multi-layer coatings 10 and 20 is shown in this example and in foregoing Example 1 (32 layers in total in case of ion plating and 34 layers in total in case of vacuum deposition). However, smaller the number of layers, narrower becomes the band width of 100% reflection even if almost 100% reflection is attained in each one of the above-mentioned wave ranges. Therefore, a slight deterioration in reflectivity may occur when incident light has angle dependency or under varying temperature conditions. In this regard, the number of depositing layers may be increased to some extent for the purpose of broadening the reflection band width. However, it is desirable to control the number of depositing layers, giving considerations to this question (the number of layers) in relation with a desired reflection band width. Although vacuum deposition an ion plating are applied in this Example 2 band in Example 1, a sputtering or ion assist process may be applied if desired.

Example 3

Figure 6:
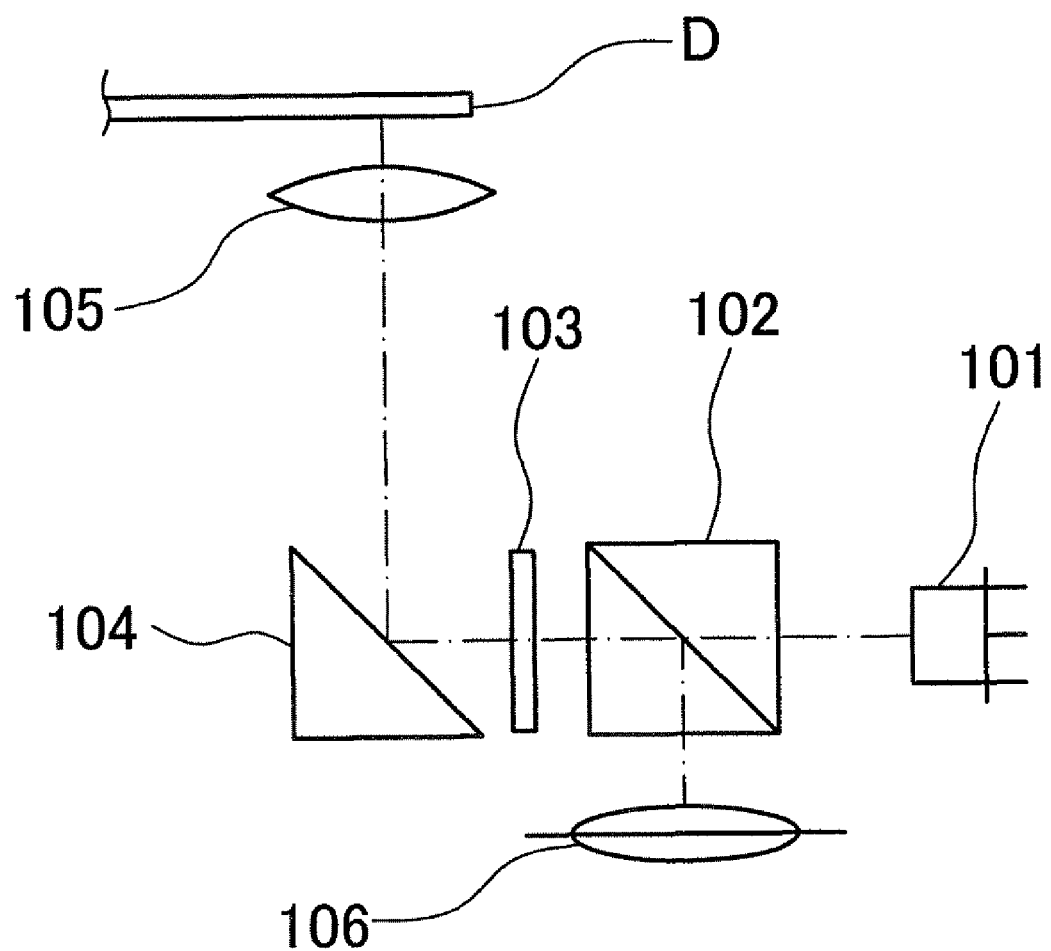
FIG. 6 is a schematic illustration showing an example of optical pickup applying the reflecting mirror according to the present invention.

In this example, the above-described reflecting mirror 1 is applied to an optical pickup for CD (780 nm), DVD (605 nm) and mass storage optical discs (405 nm). As shown in FIG. 6, the optical pickup is constituted by a light source 101, polarized beam splitter 102, λ/4 wave plate 103, reflecting mirror 104, objective lens 105 and photodetector 106.

The light source 101 emits selectively a laser beam of one of three wavelengths, i.e., a laser beam for CD, a laser beam for DVD or a laser beam for mass storage optical disc. The laser beam from the light source 101 firstly enters the polarized beam splitter 102 which splits polarized components of incident light by transmission and reflection depending upon direction of polarization. In this instance, the laser light emitted from the light source 101 is p-polarized light, and the polarized beam splitter 102 is adapted to transmit p-polarized light and reflect off s-polarized light. (alternatively may be adapted to reflect off p-polarization and to transmit s-polarization if desired). Thus, the laser beam of p-polarization from the light source 101 is transmitted through the polarized beam splitter 102, and fed to λ/4 wave plate 103 which converts linear polarization to circular polarization. Circularly polarized light coming out of λ/4 wave plate 103 is reflected by the reflecting mirror 104 and converged to a predetermined position on an optical disc D by the objective lens 105. Light reflected off the optical disc D is fed again to λ/4 wave plate 103 via the objective lens 105 and reflecting mirror 104. This time, circular polarization is converted to linear polarization by λ/4 wave plate 103. Thus, on the way back, original p-polarized light is converted to s-polarized light. That is to say, the laser beam of s-polarization is reflected off by the polarized beam splitter 102 toward the photodetector 106 where incident light is converted to electric signals by photoelectric conversion.

In this instance, it is important for the reflecting mirror 104 to have almost 100% reflection characteristics for each one of laser beams of three different wavelengths which are selectively emitted by the light source 101. Namely, the reflecting mirror 104 should have high reflectivity at all of operating wavelengths because all parts of the system are unchanged except that laser beams of different wavelengths are emitted from the light source 101. Accordingly, the reflecting mirror 1 described in the foregoing embodiment is applied in this Example as the reflecting mirror 104. As described above, since the reflecting mirror 1 is free of the problem of light absorption, light of 405 nm can be totally reflected without being absorbed by the reflecting mirror 104. Besides, the reflecting mirror has almost 100% reflectivity at all of three operating wavelengths, so that it is suitable for application to optical pickups with a light source which selectively emits laser beams of three different wavelengths like the light source 101.

Example 4

Figure 7:
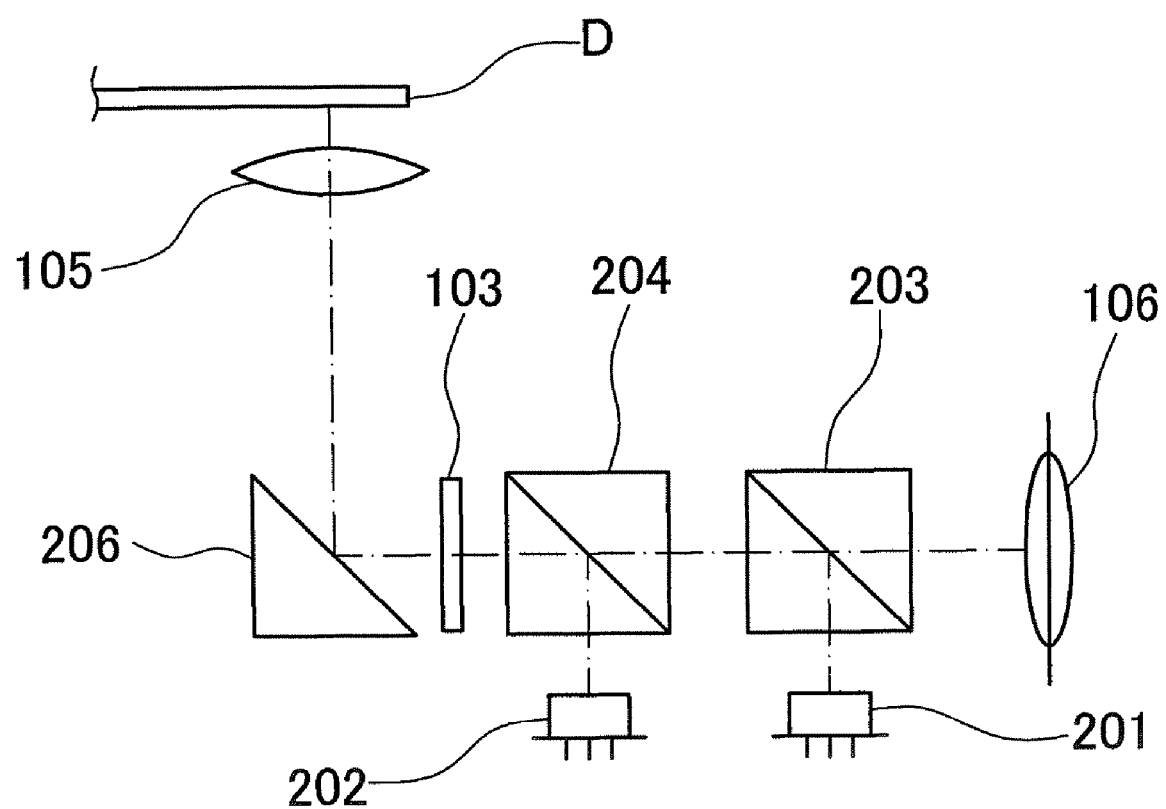
FIG. 7 is a schematic illustration showing another example of optical pickup.

Example 3 above employs the light source 101 which is adapted to selectively output laser beams of three different wavelengths, this example employs two light sources 201 and 202 as shown in FIG. 7 for emission of laser beams of three different wavelengths. Those components such as λ/4 wave plate 103, objective lens 105 and photodetector 106 are identical with the counterparts in Example 3. In the case of FIG. 7, the light source 201 is a light source which selectively emits laser beams of CD and DVD wavelengths, while the light source 202 emits exclusively a laser beam of a wavelength for mass storage optical discs. If desired, the light source 202 may be used as a light source which selectively emits laser beams of two different wavelength, and the light source 201 as a light source which emits exclusively a laser beam of one predetermined wavelength. The polarized beam splitter 203 has optical characteristics to transmit p-polarization in CD and DVD wave ranges and to transmit p-polarization in the wave range of mass storage optical discs. On the other hand, the polarized beam splitter 204 has optical characteristics to transmit p- and s-polarizations in CD and DVD wave ranges, while transmitting p-polarization and reflecting s-polarization in the wave range of mass storage optical discs. Laser beams which are emitted from the light sources 201 and 202 are all s-polarizations. Accordingly, an s-polarization laser beam of CD or DVD wave range, which is emitted from the light source 201, is reflected toward an optical disc D by the polarized beam splitter 203. On the other hand, a laser beam of a wave range of mass storage optical discs, which is emitted from the light source 202, is reflected toward a disc D by the polarized beam splitter 204. Although the polarized beam splitters 203 and 204 have been described as having optical characteristics to transmit p-polarization and to reflect off s-polarization, they may be adapted to reflect p-polarization and transmit s-polarization if desired.

Thus, a light path for each one of the three kinds of laser beams for CD, DVD and mass storage optical disc is synthesized toward the λ/4 wave plate 103. Therefore, on the way to and on the way away from the optical disc D, each one of the three laser beams is reflected by the reflecting mirror 206, an application of the reflecting mirror 1 of the above-described embodiment which can reflect each one of three laser beams almost 100% free of the problem of light absorption.

What is claimed is:

1. An optical pickup, comprising:
   a light source for emitting at least a light beam at wavelength of 405 nm, a light beam at wavelength 640 nm, and a light beam at wavelength 780 nm;
   a polarized beam splitter;
   a λ/4 wave plate and photodetector; and
   a reflecting mirror, in which a light path is formed to and from said light source, said polarized beam splitter, said λ/4 wave plate and photodetector and said reflecting mirror;
   said reflecting mirror comprising:
   a first reflective multi-layer coating formed on a substrate plate by alternately depositing a low refractivity layer and a first high refractivity layer absorptive of a wavelength of 405 nm having a refractivity higher than said low refractivity layer of the first reflective multi-layer coating; and
   a second reflective multi-layer coating formed at a light incident side of said first reflective multi-layer coating, by alternately depositing a low refractivity layer and a non-absorptive second high refractivity layer having a refractivity higher than said low refractivity layer of the second reflective multi-layer coating but lower than said first high refractivity layer in said first reflective multi-layer coating;
   wherein an incident light beam at a wavelength of 405 nm is reflected off by said second reflective multi-layer coating while incident light beams at wavelengths of 640 nm and 780 nm are reflected off by cooperative actions of said first and second reflective multi-layer coatings; and
   wherein said second reflective multi-layer coating reflects off part of incident light beams at wavelengths of 640 nm and 780 nm.

2. The optical pickup as defined in claim 1, wherein said low refractivity layers of the first and second reflective multilayer coatings are formed by deposition of an $SiO_2$-base material, said first high refractivity layer is formed by deposition of $TiO_2$, and said second high refractivity layer is formed by deposition of at least one of $Ta_2O_5$, $Nb_2O_5$, $ZrO_2$, $CeO_2$, a lanthanum-titanium mixture oxide and a zirconium-titanium mixture oxide.

3. The optical pickup as defined in claim 1, wherein said low refractivity layer is formed by deposition of an $SiO_2$-base material, said first high refractivity layer is formed by deposition of $TiO_2$, and said second high refractivity layer is formed by deposition of $Nb_2O_5$;
   said second reflective multi-layer coating being formed by alternately depositing $Nb_2O_5$ and $SiO_2$ in more than 8 layers in total, and said first reflective multi-layer coating being formed by alternately depositing $TiO_2$ and $SiO_2$ in more than 24 layers in total.

4. The optical pickup as defined in claim 1, wherein said low refractivity layers of the first and second reflective multilayer coatings, first high refractivity layer and second high refractivity layer are deposited by an ion plating, vacuum deposition, ion assist or sputtering process.

* * * * *